United States Patent [19]

Knowles

[11] 3,764,621
[45] Oct. 9, 1973

[54] CERTAIN SUBSTITUTED METHYLBENZOIC ACIDS AND SUBSTITUTED METHYCYCLOHEXANE CARBOXYLIC ACIDS

[75] Inventor: Richard N. Knowles, Hockessin, Del.

[73] Assignee: E. I. du Pont de Nemours and Company, Wilmington, Del.

[22] Filed: May 17, 1968

[21] Appl. No.: 730,200

Related U.S. Application Data

[60] Division of Ser. No. 635,304, April 20, 1967, which is a continuation-in-part of Ser. Nos. 574,499, Aug. 18, 1966, and Ser. No. 574,276, Aug. 18, 1966.

[52] U.S. Cl. ...... 260/514 R, 260/514 B, 260/515 R
[51] Int. Cl. ........................ C07c 61/08, C07c 63/04
[58] Field of Search ............... 260/514, 515, 514 R, 260/514 B, 515 R

[56] References Cited
OTHER PUBLICATIONS
Eliel et al., J. Org. Chem., Vol. 24, pp. 151–155, (1959).

*Primary Examiner*—Leland A. Sebastian
*Attorney*—Herbert W. Larson

[57] ABSTRACT

The invention relates to compounds of the formula

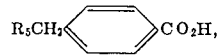

wherein $R_5$ is cycloalkyl ($C_4$ to $C_9$), cycloalkylalkyl ($C_5$ to $C_{10}$), bicycloalkyl ($C_7$ to $C_{10}$) and tricycloalkyl ($C_{10}$ to $C_{11}$) and

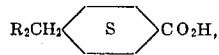

wherein $R_2$ is alkyl ($C_3$ to $C_8$), cycloalkyl ($C_4$ to $C_9$), cycloalkylalkyl ($C_5$ to $C_{10}$), bicycloalkyl ($C_7$ to $C_{10}$), or tricycloalkyl ($C_{10}$ to $C_{11}$). These compounds are useful as intermediates in preparing N-acylcylclohexyl amines, having utility as animal repellants.

13 Claims, No Drawings

CERTAIN SUBSTITUTED METHYLBENZOIC ACIDS AND SUBSTITUTED METHYCYCLOHEXANE CARBOXYLIC ACIDS

CROSS-REFERENCE

This application is a divisional application of U.S. Pat. application Ser. No. 635,304, filed April 20, 1967, which in turn is a continuation-in-part of U.S. Pat. application Ser. No. 574,499, filed Aug. 18, 1966, and Ser. No. 574,276, filed Aug. 18, 1966.

BACKGROUND OF THE INVENTION

Application Ser. No. 532,544, filed Mar. 1, 1966 now abandoned and Ser. No. 574,276, filed Aug. 18, 1966 relate to compounds containing cyclohexyl ring structures and having utility as animal repellants.

The present application is directed to those compounds useful as intermediates for making the animal repellants described in application Ser. Nos. 532.544 and 574,276.

SUMMARY OF THE INVENTION

This invention relates to five classees of intermediates for making N-acylcyclohexylamines.

More specifically, this invention refers to intermediates for synthesizing potent animal inhalation irritant compounds of the formula:

(1) 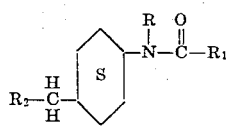

wherein
R is hydrogen, methyl or ethyl;
$R_1$ is hydrogen or alkyl of 1 through 4 carbon atoms; and
$R_2$ is striaght chain or branched alkyl of 3 through 8 carbon atoms, cyclobutyl, cyclohexyl, cyclopentyl, cycloheptyl, cyclooctyl, cyclononyl, cycloalkylalkyl of 5 through 10 carbon atoms, bicycloalkyl of 7 through 10 carbon atoms, or tricycloalkyl of 10 through 11 carbon atoms.

The intermediate compounds are described in the following formulas:

(2) 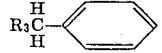

wherein
$R_3$ is bicycloalkyl of 7 through 10 carbon toms or tricycloalkyl of 10 through 11 carbon atoms.

(3) 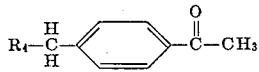

wherein
$R_4$ is cycloalkyl of 4 through 9 carbon atoms cycloalkylalkyl of 5 through 10 carbon atoms, bicycloaklyl 'f 7 through 10 carbon atoms, or tricycloalkyl of 10 through 11 carbon atoms.

(4) 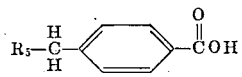

wherein
$R_5$ is cycloalkyl of 4 through 9 carbon atoms, bicycloalkyl of 7 through 10 carbon atoms, cycloalkylalkyl of 5 through 10 carbon atoms, or tricycloalkyl of 10 through 11 carbon atoms.

(5) 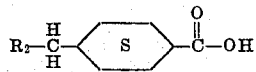

wherein
$R_2$ is alkyl of 3 through 8 carbon atoms, cycloalkyl of 4 through 9 carbon atoms, cycloalkylalkyl of 5 through 10 carbon atoms, bicycloalkyl of 7 through 10 carbon atoms or tricycloalkyl of 10 through 11 carbon atoms.

(6) 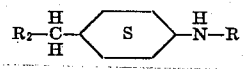

wherein
R is hydrogen, methyl or ethyl;
$R_2$ is alkyl of 3 through 8 carbon atoms, cycloalkyl of 4 through 9 carbon atoms, cycloalkylalkyl of 5 through 10 carbon atoms, bicycloalkyl of 7 through 10 carbon atoms, or tricycloalkyl of 10 through 11 carbon atoms, with the limitation that the 1 and 4 groups on the cyclohexyl ring must be in the cis configuration.

PREPARATION

The animal repellant compounds are prepared using the intermediates of formulas (2) through (6) and the following synthetic route:

R, $R_1$ and $R_2$ in he following reactions are as defined above in formula (1).

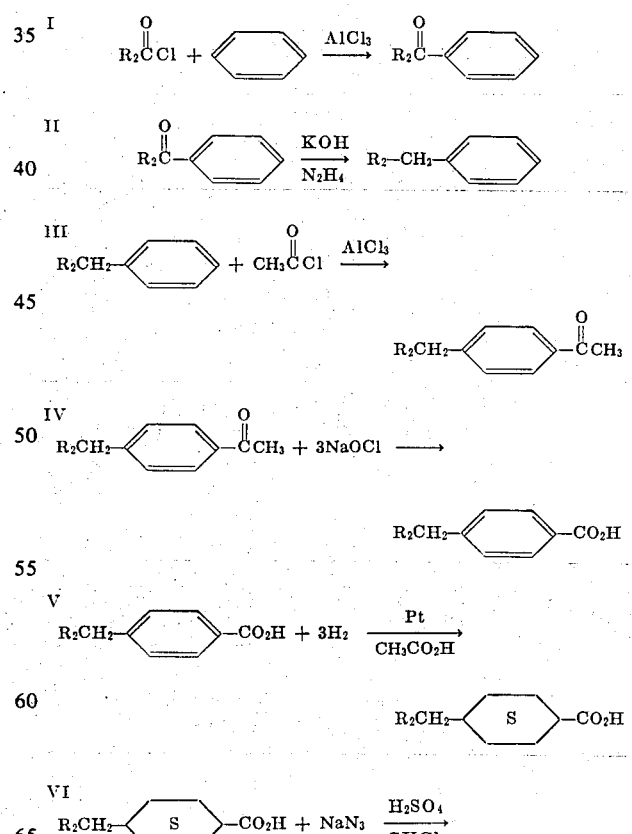

VII 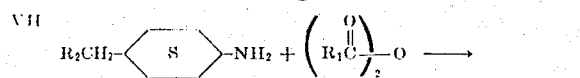

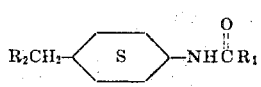

VIII 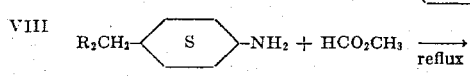

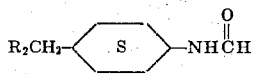

Those compounds where R is methyl or ethyl are prepared according to the following reactions where $R_1$ becomes R during reaction IX.

IX 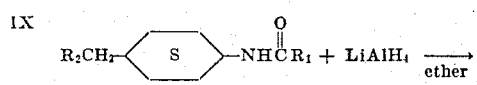

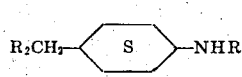

X 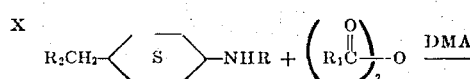

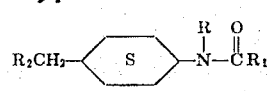

XI 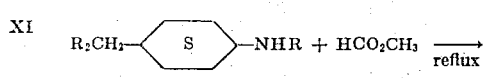

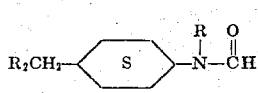

The Friedel-Crafts reaction (I) is run by carefully adding the acid chloride to a stirring mixture of aluminum chloride and benzene. A slight molar excess of catalyst is used; benzene serves as both a solvent and reactant. The acid chloride is added at such a rate so as to keep the temperature of the slurry at about 30°–40° C. The mixture is stirred for 1 additional hour after all of the acid chloride is added, and then water is slowly added to decompose the catalyst. Sufficient water is added so that all the solids are dissolved. The phenylalkyl ketone is isolated from the benzene solution and is purified by distillation.

The Wolff-Kishner reduction (II) is run in 2-(2-ethoxyethoxy)ethanol using a modification of the procedure given by J. Cason, et al. in *Organic Synthesis*, Collective Vol. IV, John Wiley and Sons, New York, (1963), p. 510. Once the reactans are mixed, they are heated to reflux for a period of 3 to 5 hours. The reflux temperature is generally in the 130°–140° C. range. After completion of the reflux period, the solution is cooled and poured into 3 to 4 volumes of water. The alkylbenzene product is extracted with pentane and purified by distillation.

The Friedel-Crafts reaction (III) is run by mixing approximately equimolar quantities of the reactants together in hexane or nitromethane at less than 5° C, The stirring mixture is slowly allowed to warm to room temperature, and when hydrogen chloride evolution subsides, the mixture is refluxed several hours. Water is then added slowly to decompose the catalyst. A sufficient quantity of water is then addes so that all of the solids are dissolved. The desired acetophenone derivative is isolated from the organic phase, and purified by distillation. Gas-liquid chromatography on an F & M Model 500 Gas Chromatographer using a 2′ × ¼″ O.D. stainless steel column, containing 10 percent Carbowax 20M on 60–80 mesh Diatoport T indicates that about 90 percent of the acetophenone is the 1,4 isomer and 2 percent is the 1,2 isomer. The 1,2 isomer has the shorter retention time.

The haloform reaction (IV) is run by slowly adding a cold (<5° C.) sodium hypochlorite solution to a stirring solution of the acetophenone derivative in methanol. This is a modification of the procedure used by E. E. Royals (J. Am. Chem. Soc., 69, 841 (1947) for the haloform reaction of α-ionone. After the sodium hypochlorite solution is added, the mixture is warmed to room temperature, and left standing over night. Thereafter, the mixture is heated to reflux, and the distillate collected until the pot temperature reises to 95°–97° C.; most of the methanol is distilled. The potis then cooled to room temperature. In those reactions where $R_2$ has a low molecular weight such as cyclobutyl the sodium benzoate derivative remains dissolved; however, when $R_2$ becomes larger, such as bicycloheptyl the sodium benzoate derivative precipitates as a soapy solid. Sulfur dioxide is bubbled into the alkaline pot concentrate until the pH drops below 3. The precipitated benzoic acid derivative is either filtered and washed with water, or extracted with methylene chloride depending on whether or not the benzoic acid is easily filterable or is of a soapy nature. Some of these benzoic acid derivatives can be recrystallized from acetonitrile or pentane, and some are purified merely by trituration with cold pentane.

The catalytic hydrogenation (V) is performed at two to three atmospheres of hydrogen using platinu oxide as catalyst and glacial acetic acid as solvent. A Parr Hydrogenation Apparatus is suitable for these reactions. This reaction produces a cis/trans isomer mixture of about 2 or 3/1. The cis and trans designation refers to the relationship of the 4-alkyl substituent and carboxylic acid group on the cyclohexane ring, this is illustrated below

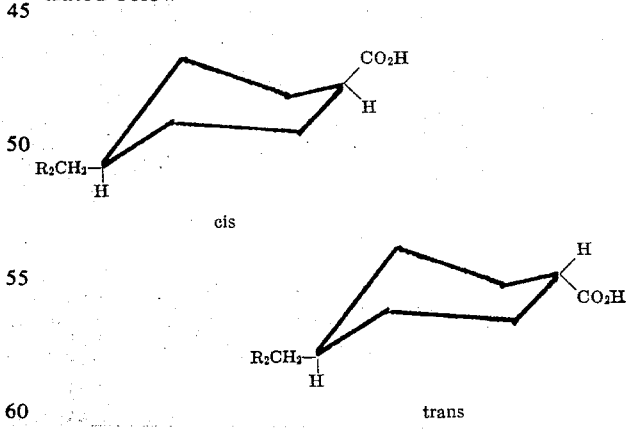

The Schmidt reaction (VI) is performed by dissolving the cyclohexane carboxylic acid derivative in a mixture of chloroform and concentrated sulfuric acid. Sodium azide is then added in small portions to the stirring mixture at a rate sufficient to keep the reaction temperature between 35° and 45° C. The mixture is stirred at about 45° to 50° C. until the bubbling nearly stops (1 to 3 hours). The mixture is then transferred to a separatory funnel, and the lower, gelatinous sulfuric acid layer is slowly dripped onto ice. The amine sulfate precipitates as a soapy material which slowly crystallizes. The chloroform should be kept away from the ice water mixture since it makes the work-up much more difficult. Those amines which crystallize as the hemisulfates or sulfates are filtered and washed with water. It is convenient to store these amines as their salts. Those amine salts which fail to crystallize are converted to the free bases by making the sulfuric acid solution alkaline, and extracting the amine with dichloromethane. The amine is then purified by distillation. The Schmidt reaction proceeds without changing the cis/trans product ratio.

The acylation (VII) can be performed by dissolving the free amine in an equal volume of dimethylacetamide (DMAC) or dimethylformamide (DMF) and adding an excess of the desired acid anhydride to the stirring solution. This reaction is very exothermic. The solution is stirred for ten minutes, and then it is poured into 10 to 100 volumes of water. The amide separates as an oil which subsequently crystallizes.

The acylation (VII) can be performed using the amine sulfate directly according to the following procedure. The amine sulfate is ground into a powder, and added to a 1:1 mixture of DMAC and 20 percent aqueous sodium hydroxide solution; there should be a large excess of base. The mixture is stirred for 10 to b 15 minutes, and then an excess of the desired acid anhydride is added. The mixture warms to about 60° to 65° C. The sulfate entirely dissolves in 10 to 20 minutes. The solution is then pored into 10 to 100 volumes of water. The amide is isolated by the usual procedures given above.

The formamides of reactin VIII are prepared by refluxing the amine with methylformate for several hours. The excess methylformate is stripped from the reaction, and the residual formamide is purified by recrystallization.

These ayclations proceed without changing the cis/-trans product ratio.

In those cases where R is methyl or ethyl, the formamide or acetamide respectively is reduced by lithium aluminum hydrode in refluxing ether. according to reaction IX. The amine is isolated from the reaction after the lithium aluminum hydride is destroyed. These amines are purified by distillation.

Reactions X and XI are run according to the procedures described for reactions VII and VIII respectively.

An alternative synthesis route can be used when the appropriately substituted aniline derivatives are available. This route is illustrated below.

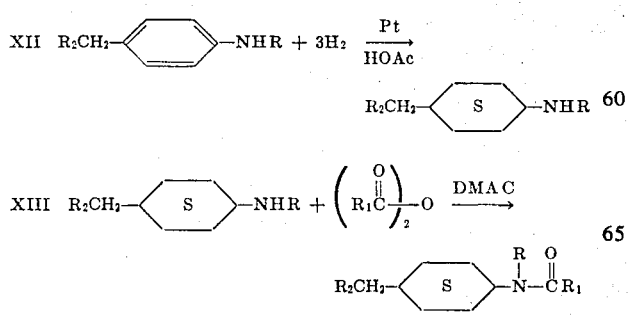

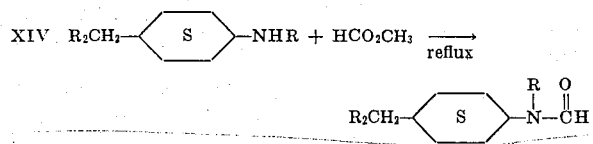

The hydrogenation (XII) can be performed at 1 to 3 atmospheres of hydrogen on a Parr Hydrogenation Apparatus using platinum oxide as cataylyst and glacial acetic acid as solvent. Hydrogen up-take is quite slow.

The cis/trans ratio of the cyclohexylamine product is about 1:1.

Reactions XIII and XIV are performed according to reactions VII and VIII discussed above. The cis/trans-ratio for the amides from XII and XIII is about 1:1.

The pure amide isomers from reactions VII, VII, X, XI, XIII and XIV can be separated by chromatography over silicic acid using methylcyclohexane staturated with acetonitrile as the eluting solvent. Isomer mixtures also can be separed by gas-liquid chromatography using can be separated by gas-liquid chromatography using 10 percent Carbowax 20M on 60–80 mesh Diaoport T. In both of these chromatography methods, the cis isomer elutes before the trans isomer. The cis amine isomer can be regenerated by alkaline hydrolysis of the purifed amide.

The following additional examples describe the inbention in greater detail.

EXAMPLE 1

A 23.9 gram quantity of 4-n-butylaniline (from Aldrich Chemical Company) is dissolved in 250 milliliters of glacial acetic acid, and 1 gram of Adam's Catalyst ($PtO_2$) is added. The mixture is then hydrogenated at two to three atmospheres using a Parr Hydrogenation Apparatus. To insure complete reduction, the hydrogenation is run over night. The catalyst is then filtered, and the acetic acid is removed under reduced pressure on a steam bath. The concentrate is taken up in ether and washed with dilute, aqueous sodium bicarbonate. The ethereal solution is dried ($mGSO_4$), filtered and evaporated in vacuum leaving 21 grams of the 4-n-butylcyclohexylamine ($n_D^{25}$ 1.4574). The amine is taken up in two volumes of dimethylcaetamide and treated with one volume of acetic anhydride. The temperature of the stirring solution rises rapidly to 60°–80° C. After having stirred for 10 minutes, the solution is poured into ten volumes of water. The oil which separates is extracted with ether. The ethereal solution is dried ($MgSO_4$) filtered and stripped leaving an oil which slowly crystallizes. This waxy solid solftens at 57° C. and melts from 79°–100° C. Gas-liquid chromatography of this cis/trans mixture of N-acetyl-4-n-butylcyclohexyl-amine on an F & M Model 500 Gas Chromatograph over 10 percent Carbowax 20M on 60–80 mesh Diatoport T in a ¼" ×2' stainless steel column at a temperature of 200° C., a block temperature of 308° C., and an injection port temperature of 280° C. with a He flow rate of 60 cc./min, shows that the cis:trans ratio is about 1:1.

The retention times for the cis and trans isomers are 28.0 and 32.5 minutes respectively. The cis isomer causes severe burning of the oeprator's nose as it elutes from the column while the trans isomer does not cause much irritation.

The infra-red spectrum (nujol) for this mixture shows characteristic peaks at 3,300 $cm^{-1}$ for the N-H, 1,630 and 1,560 cm $^{116\ 1}$ for the amide carbonyl, 1,320 cm $^{-1}$ for the trans isomer and 1,280 cm$^{-1}$ for the cis isomer.

Anal. Calc'd. for $C_{12}H_{23}NO$: C, 73.0; H, 11.8; N, 7.1%

Found: C, 72.9; H, 11.7; N, 6,7%

Mice are treated by aerosol exposure to the cis/trans mixture of N-acetyl-4-n-butylcyclohexylamine in the following manner: The compound is administered as an aerosol into 2.8 liter chamber. The exposure chamber consists of a 2.8 liter bell jar over a nebullizer inserted through the follor of the chamber. Mice are exposed for 5 minutes to 200.0 micrograms per liter (1,000Ct). The compound is dissolved in 1.4 ml. of acetone and during a span of 20 seconds the compound is sprayed up into a chamber. No further air is transferred into or out of the chamber during the 5 minute exposure.

After this exposure, irritant effects are observed in all mice exposed. The mice used as controls exposed to 1.4 ml. of acetone alone exhibit no irritant effects. Irritant effects can be described as the presence of one or more of the following reactive signs:

a. hyperemia of the ears, nose and tail
b. abnormal gait, including rubbing of the nose on the floor while running about
c. blinking
d. slaivation
e. depression
f. dyspnea
g. hunched posuture
h. face-pawing.

EXAMPLE 2

A mixture consisting of 400 ml.of benzene and 67 g. (0.5 mole) of aluminum chloride is stirred in a one liter round bottom flash fitted with a stirrer, thermometer condenser connected to a scrubber, dropped funnel, and coolling bath. Cyclobutane carbonyl chloride (50 g.; 0.42 mole) is added dropwise while the pot temperature is held below 35° C, The brown slurry is stirred for 1 hour and then water is cautiously added while the pot temperature is held below 30° C. Sufficient water is added so that all the solids dissolve. Two liquid phases are obtained. The mixture is transferred to a separatory funnel, and the benzene layer is separated. The aqueous layer is washed with 100 ml. of beneze which is then combined with the first benzene fraction. The aqueous solution is discarded. The combined benzene fractions are washed sequentially with 200 ml. of 5 percent aqueous sodium hydroxide solution and 250 ml. of water. The benzene solution is dried with magnesium sulfate, filtered, and evaporated in vacuum. The residual oil is distilled at 67° C. at 0.1 mm.of mercury giving cyclobutylphenylketone ($n_D^{25}$ 1.5455).

Anal. Calc'd. for $C_{11}H_{12}O$: C, 82.5; H, 7.6&,

Found: C, 81.9; H, 76.& ,

EXAMPLES 3 – 10

The following phenylketone derivatives are prepared according to the procedures given for cyclobutylphenylketone in Example 2 by substituting the appropriate molar amount of the acid chloride for the cyclobutane carbonyl chloride of Example 2. The acid chlorides are either commercially available or easily prepared from the known acid with thionylchloride.

3. 3-[2.21]-Bicycloheptylphenylketone: $B_{0.1}$ 98° C; $n_D^{25}$ 1.5557.
4. Cyclopentylphenylketone: $B_7$ 130°–134° C.; $n_D^{25}$ 1.5484
5. 3-Cyclopentylpropiophenone: $B_{0.4}$ 126° C.; $n_D^{25}$ 1.5300

Anal. Calc'd. for $C_{14}H_{18}O$: C, 83.2; H, 8.9%

Found: C, 83.1; H, 8.9% .

6. Cycloheptylphenylketone: $B_{1.3}$ 134°–136° C.; $n_D^{25}$ 1.5415
7. 1-Adamantylphenylketone: m. 49°–52° C.
8. 2'-[2.2.2]-Bicyclooctylphenylketone
9. 1-[3.2.1]-Bicyclooctylphenylketone
10. 2-[3.3.1]-Bicyclononylphenylketone

EXAMPLE 11

A solution of potassium hydroxide (140g.; 2.5 mole) in 500 ml. of 2-(2-ethoxyethoxyl)ethanol (from Matheson, Coleman & Bell Co.) is prepared by carefully heating the mixture until all of the solids are gone. The solution is cooled to below 100° C. Then 2-[2.2.1]-bicyclopheptylphenylketone (94.7g,; 0.50 mole) and 99% hydrazine hydrate (110 g.; 2.2 mole) are added all at once. The reactants are refluxed for 4 hours at 135° C., and then the solution is poured into 2.5.1 of water. The oil which separates is extracted wth three-500 ml. portions of pentane. The aqueous phase is discarded, and the combined pentane fractions are dried with magnesium sulfate, filtered and evaporated in vacuu,. The residual oil is distilled at 120° C. at 12 mm. of mercury to give phenyl-2-[2.2.1]-bicyclopheptylmethane ($n_D^{25}$ 1.5342).

Anal. Calc'd. for $C_{14}H_{18}$: C, 90.3; H, 9.7%

Found: C, 90.8; H, 9.5%

EXAMPLES 12 – 22

The following phenylmethane derivatives are prepared according to the procedure given for phenyl-2-[2.2.1]-bicyclophptylmethane in Example 8 by substituting the like molar amount of the appropriate phenylketone for 2-[2.2.1]-bicycloheptylphenylketone of Example 8.

12. Isobutylbenzene: $B_{atm.}$ 168° C.; $n_D^{25}$ 1.5800.
13. Cyclobutylphenylmethane: $B_{12}$ 89° C.; $n_D^{25}$ 1.5150.
14. Cyclopenthlphenylmethane: $B_4$ 92° C.; $n_D^{25}$ 1.5165.
15. 1-cyclopentyl-3-phenylpropane: $B_6$ 130° C.; $n_D^{25}$ 1.5090.
16. Cycloheptylphenylmethan: $B_3$ 110–113° C.; $n_D^{25}$ 1.5218.

Anal. Calc'd. for $C_{14}H_{20}$: C, 89.3; H, 10.7%

Found: C, 88.6; H, 10.4%, 17. 1-Adamantylphenylmethane: $B_{0.2}$ 118°–120° C.; $n_D^{25}$ 1.5563; m.b 37°–41° C. Calc'd. for $C_{17}H_{22}$: C, 90.2; H, 9.8%.

Found: C, 89.5; H, 9.5%.

18. 2-[2.2.2]- Bicyclooctylphenylmethane.
19. 1-[3.2.1]-Bicyclooctylphenylmethane.
20. 2-[3.3.1]-Bicyclononylphenylmethane.
21. 1-Homoadamantyphenylmethane.
22. 2-[3.2.0]Bicyclopheptylphenylmethane.

EXAMPLE 23

A solution of cyclobutylphenylmethane (20.5 g.; 0.14 mole) and acetyl chloride (12.5 g.; 0.16 mole) in 400 ml. of hexane is cooled to 0° C. and aluminum chloride (21.5 g.; 0.16 mole) is added all at once. The reaction equipment is similar to that given in Example 2. The stirring mixture is warmed to about 5° C., and held there for ½ hour. The slurry is then warmed to room temperature for 1 hour, and finally refluxed for 30 minutes. Water is then carefully added to decompose the aluminum chloride. Sufficient water is finally added to dissolve all the solids and obtain two liquid phases The mixture is transferred to a seqparoty funnel, and the hexane solution is isolated. The aqueous phase is washed with 100 ml. of hexane, and then discarded. The combined hexane fractions are washed sequentially with 100 ml. of 5 percent aqueous sodium hydroxide solution and 100 ml. of water. The hexane solution is dried with magnesium sulfate, filtered and evaporated in vacuum. The residual oil is distilled at 108° C. at 1 mm. of Hg to give 4'-cyclobutylmethyl-acetophenone ($n_D^{25}$ 1.5388).

Anal. Calc'd. for $C_{13}H_{16}O$: C, 82.9; H, 8.6%.
Found: C, 83.1; H, 8.5%.

The pertinent features in the infra-red spectrum are a very strong peak at 1,680 cm$^{-1}$ (carbonyl) and a peak at 850 cm$^{-1}$ indicative of two adjacent benzenoid hydrogens thus showing that the benzene ring has substituents in the 1 and 4 positions.

A gas-liquid chromatogram obtained on an F & M Modeal 500 Gas Chromatograph using a 2' × ¼" O.D. Stainless Steel column packed with 10% Carbowax 20M on 60–80 mesh Diatoport T with a helium flow rate of 60cc/min. a block temperature of 307° C., an injection port temperature of 262° C., and a column temperature of 225° C. shows that the sample consists of 98% of the 1,4-isomer and 2% of the 1,2-isomer which have retention times of 9.5 and 8.0 minutes respectively.

EXAMPLES 24–42

The following acetophenone derivatives are prepared according to the procedure given for 4'-cyclobutylmethylacetophenone in Example 23 by substituting a like amount of the appropriate alkylphenylmethane derivative for the cyclobutylphenylmethane of Exampe 23. For those compound where $R_2$ is bi-or tricycloalkyl, nitromethane can be sued as solvent in place of the hexane. The infra-red spectra for all these compounds are similar to that reported for 4'-cyclobutylmethylacetophenone in Example 23.

24. 4'-Isobutylacetophenone: $B_3$ 110°C.; $n_D^{25}$ 1.51556.
25. 4'-Pentylacetophenone: $B_2$ 122° C.; $n_D^{25}$ 1.5142.
26. 4'-Cyclopenty'methylacetophenone: $B_{0.5}$ 130°–132°C.; $n_D^{25}$ 1.5394.

Calc'd. for $C_{14}H_{18}O$: C, 83.2; H, 8.9%.
Found: C, 83.5; H, 8.9%.

Gas-liquid chromatography under conditions like those in Example 23 at a column temperature of 200° C. gives peaks at 14.0 minutes (2% of sample) for the 1,2-isomer at 17.5 minutes (98% of sample) for the 1,4-isomer.

27. 4'-(2-Methylpentyl)acetophenone: $B_{0.15}$ 96° C.; $n_D^{25}$ 1.5120.

Anal. Calc'd. for $C_{14}H_{20}O$: C, 82.3; H, 9.9%.
Found: C, 82.2; h, 9.8%,

Gas-liquid chromatography under conditions like those in Example 23 gives peaks at 6.0 minutes (1% of sample) for the 1,2-isomer and 7.5 minutes (99% of sample) for the 1,4-isomer.

28. 4'-n-Hexylacetophenone: $B_3$ 142°–144° C.; $n_D^{25}$ 1.5106.
29. 4'-Cyclohexylmethylacetophenone.
30. 4'-n-Heptylacetophenone: $B_1$ 130°–134° C.; $n_D^{25}$ 1.5084.
31. 4'-n-Octylacetophenone: $B_{0.3}$ 128° C.; $n_D^{25}$ 1.5060.
32. 4'-(3-Cyclopentylpropyl)acetophenone: $B_{0.5}$ 154° C.; $n_D^{25}$ 1.5298.

Anal. Calc'd. for $C_{16}H_{22}O$: C, 83.5; H, 9.6%.
Found: C, 83.5; H, 9.6%.

33. 4'-Cycloheptylmethylacetophenone: $B_{0.2}$ 136°–140° C.; $n_D^{25}$ 1.5426.

Anal. Calc'd. for $C_{16}H_{22}O$: C, 83.4; H, 9.6%.
Found: C, 83.6; H, 9.7%.

34. 4'-Cyclononylmethylacetophenone.
35. 4'-Cyclooctylmethylacetophenone.
36. 4'-(2-[2.2.1]-Bicycloheptylmethyl)acetophenone: $B_{0.3}$ 117°C.; $n_D^{25}$ 1.5511.

Anal. Calc'd. for $C_{16}H_{20}O$: C, 84.2; H, 8.8%.
Found: C, 84.1; H, 8.8%. Gas-liquid chromatography under conditions like those given in Example 23 gives a single peak with a retention time of 29.5 minutes.

37. 4'-(1-Adamantylmethyl)acetophenone.
38. 4'-(2-[2.2.2]-Bicyclooctylmethyl)acetophenone.
39. 4'-(1-[3.2.1]-Bicyclooctylmethyl)acetophenone.
40. 4'-(2-[3.3.1]-Bicyclononylmethyl)acetophenone.
41. 4'-(1-Homoadamantylmthyl)acetophenone.
42. 4'-(2-[3.2.0]-Bicycloheptylmethyl)acetophenone.

EXAMPLE 43

A solution of 4'-cyclobutylmethylacetophenone (20 g.; 0.11 mole) in 225 ml. of methanol is cooled to less than 5° C., and 275 ml. of a 1.29M sodoum hypochlorite solution (0.35 moles) is slowly added. The temperature is held below 5° C. during the addition. The sodium hypochlorite solution is conveniently prepared according to the procedure given by M. S. Newman, *Organic Synthesis*, Collective Volume II, John Wiley and Sones, New York, 1943, p. 429. After about 25 ml. of the hypochlorite solution is added, a white precipitate forms. When all of the hypochlorite solution is added, the stirring mixture is allowed to warm to room temperature, and left standing over night. Some chloroform usually separates during the night. The stirring mixture is heated to reflux (80° .) and distillate ( 200 ml.) is collected until the pot temperature rises above 95° C. The pot concentrate is cooled to room temperature, and sulfur dioxide is bubbled into it until the pH falls below 3. The precipitate is extracted with two-300 ml. portions of dichloromethane, and the aqueous phase is discarded. The combined dichloromethane solutions are dried with magnesium sulfate, filtered and evaporated in vacuum. The yellow residue is triturated with cold pentane, and filtered. The 4-cyclobutylmethylbenzoic acid melts at 146°–149° C. and has an infra-red spectrum showing typical benzoic acid absorption peaks.

Anal. Calc'd. for $C_{12}H_{14}O_2$: C, 75.8; H, 7.4%.
Found: C, 75.5; H, 7.6%.
Calc'd. neutral equivalent weight: 190
Found: 198

EXAMPLES 44 – 62

The following 4-alkylbenzoic acid derivatives are prepared according to the procedure given for 4-cyclobutylmethylbenzoic acid in Example 43 by substituting the appropriate 4'-alkylacetophenone in a like molar amount for the 4'-cyclobutylmethylacetophenone of Exampe 43. All of these compounds show the typical benzoic acid absorption peaks in thier infra-red spectra.

44. 4-Isobutylbenzoic acid: m. 143.0°–144.5° C.

Anal. Calc'd. for $C_{11}H_{14}O_2$: C, 74.2; H, 7.9%.

Found: C, 74.2; H, 7.9%

45. 4-n-Pentylbenzoic Acid: m. 87.0°–88.5°C.
46. 4-Cyclopentylmethylbenzoic acid: m. 143.0°–145° C.

Anal. Calc'd. for $C_{13}H_{16}O_2$: C, 76.5; H, 7.9%.
Found: C, 76.1; H, 75.%.

47. 4-(2-Methylphentyl)benzoic acid: m. 103–110° C.

Anal. Calc'd. for $C_{13}H_{18}O_2$: C, 75.7; H, 8.8%.
Found: C, 75.9; H, 8.9%.

48. 4-n-Hexylbenzoic acid. m. 77°–82° C.
49. 4-Cyclohexylmethylbenzoic acid.
50. 4-n-Heptylbenzoic acid: m. 93°–96° C.
51. 4-n-Octylbenzoic acid: m. 96°–98°C.
52. 4-(3-Cyclopentylpropyl)benzoic acid: m. 117°–119° C.

Anal. Calc'd. for $C_{15}H_{20}O_2$: C, 77.5; H, 8.7%.
Found: C, 77.6; H, 8.7%.

53. 4-Cycloheptylmethylbenzoic acid: m. 171°–173° C.

Anal. Calc'd. for $C_{15}H_{20}O_2$: C, 77.5; H, 8.7%.
Found: C, 77.2; H, 8.7%.

54. 4-Cyclooctylmthylbenzoic acid.
55. 4-Cyclononylmethylbenzoic acid.
56. 4-(2-[2.2.1]-Bicycloheptylmethyl)benzoic acid: m. 171°–173+ C., Anal. Calc'd. for $C_{15}H_{18}O_2$: C, 78.3; H, 7.9%.
Found: C, 77.6; H, 7.9%.
Calc'd. neutral equivalent weight: 230.
Found: 243.

57. 4-(1-Adamantylmethyl)benzoic acid.
58. 4-(2-[2.2.2]-Bicyclooctylmethyl)benzoic acid.
59. 4-(1-[3.2.1]-Bicyclooctylmethyl)benzoic acid.
60. 4-(2-[3.3.1]-Bicyclononylmethyl)benzoic acid
61. 4-(1-Homoadamantylmethyl)benzoic acid.
62. 4-(2-[3.2.0]-Bicycloheptylmethyl)benzoic acid.

EXAMPLE 63

A sample of 4-cyclobutylmethylbenzoic acid (8.3 g.; 0.044 mole) is dissolved in 250 ml. of glacial acetic acid in a 500 ml. pressure bottle and platinum oxide (1 g.) is added. The mixture is then shaken under a hydrogen pressure of 45 o.s.i.g. on a Parr Hydrogenation Apparatus for 24 hours; the final pressure is 33 p.s.i. g. The catalyst is filtered, and the acetic acid removed in vacuum. The residual oil is taken up in 200 ml. of ether, and washed with two-100 ml. portions of water to remove the residual acetic acid. The ethereal solution is then dried with magnesium sulfate, filterd and evaporated in vacuum leaving an oil which subsequently crystallizes. The 4-cyclobutylmethylcyclohexane carboxylic acid is recrystallized from a mixture of ethanol and water, and melts from 59° to 69° C. The cis/trans mixture of carboxylic acids causes the braod melting range.

Anal. Calc'd. for $C_{12}H_{20}O_2$: C, 73.5; H, 10.2%.
Found: C, 73.4; H, 10.2%.

The infra-red spectrum shows that the benzene ring has been reduced/

EXAMPLES 64 –82

The following 4-alkylcyclohexane carboxylic acid derivatives are prepared according to the procedure given for 4-cyclobutylmethylcyclohexane carboxylic acid in Example 63 by substituting the appropriate 4-alkylbenzoic acid in a like molar amount for the 4-cyclobutylmethylbenzoic acid of Example 63. Infrared spectra of these compounds also show that the benzene rings have been reduced. 64. 4-Isobutylcyclohexane carboxylic acid: $B_{0.8}$ 118°–119° C.; $n_D^{25}$ 1.4638.

Anal. Calc'd. for $C_{11}H_{20}O_2$: C, 71.7; H, 10.9%
Found: C, 72.3; H, 11.3%.

65. 4-n-Pentylcyclohexane carboxylic acid: $B_{0.5}$ 138+ C.; $n_D^{25}$ 1.4652.

Anal. Calc'd. for $C_{12}H_{22}O_2$: C, 72.8; H, 11.2%.
Found: C, 72.8; H, 11.4%.

66. 4-Cyclopentylmethylcyclohexane carboxylic acid: $_{0.4}$ 140° C.; $n_D^{25}$ 1.4910. m. 38°–47° C.

Anal. Calc'd. for $C_{13}H_{22}O_2$: C, 74.2; H, 10.5%
Found: C, 73.9; H, 10.7%.

67. 4-(2-Methylphentyl)cyclophexane carboxylic acid: $B_{0.3}$ 126°–130° C.; $n_D^{25}$ 1.4662.

Anal. Calc'd. for $C_{13}H_{24}O_2$: C, 73.5; H, 11.3%.
Found: C, 73.8; H, 11.2%.

68. 4-n-Hexylcyclohexane carboxylic acid: $B_{0.3}$ 129°–131° C.; $n_D^{25}$ 1.4666.

Anal. Calc'd. for $C_{13}H_{24}O_2$: C, 73.4; H, 11.4%.
Found: C, 74.0; H, 11.1%.

69. 4-Cyclohexylmethylcyclohexane carboxylic acid: m. 62° C.

Anal. Calc'd. for $C_{14}H_{24}O_2$: C, 74.9; H, 10.8%.
Found: C, 75.2; H, 10.7%.

70. 4-n-Heptylcyclohexane carboxylic acid; $B_{0.4}$ 160° C.; $n_D^{25}$ 1.4676.

Anal. Calc'd for $C_{14}H_{26}O_2$: C, 74.3; H, 11.6%.
Found: C, 74.5; H, 11.4%.

71. 4-n-Octylcyclohexane carboxylic acid: m. 36°–39° C. (from acetonitrile)

Anal. Calc'd. for $C_{15}H_{28}O_2$: C. 75.0; H, 11.4%.
Found: C, 75.5; H, 11.9%.

72. 4-(31-Cyclopentylpropyl)cyclohexanecarboxylic acid: $B_{0.6}$ 163° C.; $n_D^{25}$ 1.4872.

Anal. Calc'd. for $C_{15}H_{26}O_2$: C, 75.5; H, 11.0%.
Found: C, 75.4; H, 10.8%.

73. 4-Cycloheptylmethylcyclohexane carboxylic acid; $B_{0.5}$ 160°–162° C.; $n_D^{25}$ 1.4963; m. 45°–49° C. Calc'd for $C_{15}H_{26}O_2$: C, 75.5; H, 11.0%.
Found: C, 75.5; H, 10.8%. Neutral Equivalent: Calc'd 238. Found 238.

74. 4-n-Nonylcyclohexane carboxylic acid.
75. 4-Cyclononylmethylcyclohexane carboxylic acid.
76. 4-(2-[2.2.1]-Bicycloheptylmethyl)cyclohexane carboxylic acid: m. 64°–73° C. (from ethanol).

Ana. Calc'd. for $C_{15}H_{24}O_2$: C, 76.2; H, 10.2%.
Found: C, 76.1; H, 10.1%.

77. 4-(1-Adamantylmethyl)cyclohexane carboxylic acid.
78. 4-(2-[2.2.2]-Bicyclooctylmethyl)cyclohexane carboxylic acid.
79. 4-(1-[3.2.1]-Bicyclooctylmethyl)cyclohexane carboxylic acid.
80. 4-(2-[3.3.1]-Bicylononylmethyl)cyclohexane carboxylic acid.
81. 4-(1-Homoadamantylmethyl)cyclohexane carboxylic acid.
82. 4-(2-[3.2.1]-Bicyloheptylmethyl)cyclohexane carboxylic acid.

EXAMPLE 83

A sample f 4-n-hexylcyclohexane carboxylic acid (24 g.; 0.11 mole) is taken up in a mixture of 200 ml. of chloroform and 110 ml. of concentrated sulfuric acid in a 500 ml. Erlenmery flask. Sodium azide (9.8 g.; 0.15 mole) is carefully added with a spatual at a rate to keep the temperature of the stirring mixture between 35° and 45° C. After completion of the sodium azide addition, the stirring mixture is heated at 45°–50° C. for 2 hours; the rate of gas evolution is very slow at this time. The mixture is transferred to a separating funnel and the lower, gelatinous sulfuric acid layer is slowly dripped into one liter of crushed ice. The 4-n-hexylcyclohexylamine hemisulfate crystallizes slowly. The salt is filtered and washed with water; it is almost completely insoluble in water. The melting point is above 300° C.

Anal. Cald'd. for $C_{12}H_{25}N \cdot 1/2H_2SO_4$: C, 62.1; H, 11.3; N, 6.0; S, 6.9%.

Found: C, 61.8; H, 11.1; N, 6.0; S, 7.1%.

The infra-red spectrum shows absorptions characteristic of amine salts and sulfates and has no absorption corresponding to a carboxyl function.

EXAMPLES 84 – 102

The following 4-alkylcyclohexylamine derivatives or their salts are prepared according to the procedure given for 4-n-hexylcyclohexylamine hemi-sulfate in Example 83 by substituting the appropriate 4-alkylcyclohexane carboxylic acid in like amount by weight for the 4-hexylcyclohexane carboxylic acid of Example 83. In those instances where the free amines are prepared, the amine salt is dissolved in 10% aqueous sodium hydroxide solution, and the free amine is extracted with dichloromethane. The dichloromethane solution is dried with magneius sulfate, filtered and evaporated in vacuum. The residual oil is distilled in vacuum through a spinning band column. The infra-red spectra of these compounds all show the loss of the carbonyl function and the presence of an amino function.

84. 4-Isobutylcyclohexylamine: $B_{1.4}$ 56° C.; $n_D^{25}$ 1.4552.

Anal. Calc'd. for $C_{10}H_{21}N$: C, 77.4; H, 13.6; N, 9.0; %.

Found: C, 77.6; H, 13.5; N, 9.1%.

85. 4-n-Pentylcyclohexylamine: $B_{1.5}$ 76° C.; $n_D^{25}$ 1.4612.

Anal. Calc's. for $C_{11}H_{23}N$: C, 78.0; H, 13.7; N, 8.3%.

Found: C, 77.9; H, 13.6; N, 8.6%.

86. 4-Cyclopentylmethylcyclohexylamine hemi-sulfate: m >300° C.

Anal. Calc'd. for $C_{12}H_{23}N \cdot 1/2H_2SO_4$: C, 62.6; H, 10.5; N, 6.1%.

Found: C, 62.0; H, 10.7; N, 6.0%.

87. 4-(2-Methylpentyl)cyclohexylamine: B $B_1$ 80–81° C.; n $n_D^{25}$ 1.4625.

Anal. Calc'd. for $C_{12}H_{25}N$: C, 78.7; H, 13.7; N, 7.6%.

Found: C, 78.3; H, 13.7; N, 8.1%.

88. 4-Cyclobutylmethylcyclohexylamine.

89. 4-cis-Cyclohexylmethylcyclohexylamine hemi-sulfate: m. >300° C.

Anal. Calc'd. for $C_{13}H_{25}N \cdot 1/2H_2SO_4$: C, 64.0; H, 10.8; S, 6.6%.

Found: C, 63.9; H, 10.6; S, 6.9%.

90. 4-n-Heptylcyclohexylamine hemi-sulfate hemi-hydrate: m. 300° C.

Anal. Calc'd. for $C_{13}H_{27}N \cdot 1/2H_2SO_4 \cdot 1/2H_2O$: C, 62.3; H, 11.5; N, 5.6%

Found: C, 62.6; H, 12.0; N, 5.0%.

91. 4-n-Octylcyclochexylamine hemi-sulfate hemi-hydrate.

Anal. Calc'd. for $C_{14}H_{29}N \cdot 1/2H_2SO_4 \cdot 1/2H_2O$: C, 62.4; H, 11.6; N, 5.2%.

Found: C, 61.8; H, 12.0; N, 5.1%.

92. 4-(3-Cyclopentylpropyl)cyclohyexylamine sulfate; m. >300° C.

Anal. Calc'd. for $C_{14}H_{27}N \cdot H_2SO_4$: C, 54.6; H, 9.5; N, 4.6; S, 10.4%.

Found: C, 55.2; H, 9.8; N, 4.5; / S. 9.9%.

93. 4-Cycloheptylmethylcyclohexylamine hemi-sulfate: m >300° C.

94. 4-Cyclooctylmethylcylcohexylamine hemi-sulfate: m >300° C.

95. 4-Cyclononylmethylcylcohexylamine hemi-sulfate: m > 300° C.

96. 4-(2-[2.2.1]-Bicycloheptylmethyl)cyclohexylamine hemi-sulfate dihydrate: m.>300° C. Calc'd for $C_{14}H_{25}N \cdot C_{14}H_{25}N1/2H_2SO_4 \cdot 2H_2O$: C, 57.9; H, 9.6; N, 4.8%.

Found: C, 58.5; H, 9.3; N, 4.7%.

97. 4-(1-Adamantylmethyl)cyclohexlamine sulfate: m.>300° C.

98. 4-(2-[2.2.2]-Bicyclooctylmethyl)cyclohexy/amine sulfate: m.>300° C.

99. 4-(1-[3.2.1]-Bicyclooctylmethyl)cyclohexylamine sulfate: m. >300° C.

100. 4-(2-[3.3.1 -Bicyclononylmethyl)cyclohexylamine hemi-sulfate: m.×300° C.

101. 4-(1Homoadamantylmethyl)cyclohexylamine suflafte: m. >300° C.

102. 4-(2-[3.2.0]-Bicycloheptylmethyl)cyclohexylamine hemi-sulfate: m.>300° .

EXAMPLE 103

A sample of 4-n-hexylcyclohexylamine hemi-sulfate (10 g.; 0.043 mole) is stirred for 10 minutes in a mixture consisting of 100 ml. of dimethylacetamide and 25 ml. of 20% aqueous sodium hydroxide solution. Acetic anhydride (20 ml.) is added with stirring; the temperature rises to 75°–80° C. After the temperature has dropped to about 60° C., the milky suspension is filtered to remove any traces of unreacted 4-n-hexylcyclohexylamine hemi-sulfate. The milky filtrate is poured into 1,200 ml. of water, and the oil which separates crystallizes. Teh crystalline N-acetyl-4-n-hexylcyclohexylamine is filtered and washed with water. It melts from 49° to 87° C.

Anal. Calc'd. for $C_{14}H_{27}NO$: C, 74.8; N, 12.1; N, 6.2%.

Found: C, 74.7; H, 12.0;N, 6.3%.

Gas-liquid chromatography on an F & M Model 500 Gas Chromatograph using a 2' × ¼"O.D. stainless steel column packed with 10% Carbowax 20M on 60–80 mesh Diatoport T at a column temperature of 200° C., a block temperature of 308° C. an injection port temperature of 265° C. and a helium flow rate of 60 cc/min. shows that the sample consists of two compounds present to the extent of 64% and 36% which have retention times of 53.3 and 61.8 minutes respectively.

A nuclear magnetic resonance spectrum of the mixture shows that the larger component is N-acetyl-cis-4-n-hexylcyclohexylamine and the smaller The pure isomers are isolated by adsorption chromatography over silicic acid using methylcyclohexane saturated with acetonitrile as the eluting solvent; the adsorbant to compound ratio is 50:1. N-Acetyl-cis-4-n-hexylcyclohexylamine melts at 55.0° to 57.0° C., and N-acetyl-trans-4-n-hyxylcyclohexylamine melts at 123.0°–124° C.

The cis/trans mixtures are used for the purposes of this invention without separation of the isomers.

N-Acetyl-4-n-hexylcyclohexylamines are used to treat mice according to the procedures given in Example 1 with like results. As the time mice are treated in such manner with the pure isomers, the cis isomer is shown to be much more of an irritant than the trans isomer.

Examples 104 – 125

The following N-acyl-4-alkylcyclohexylamines are prepared according to the procedure given for N-acetyl-4-n-hexylcyclohexylamine in Example 103 by substituting in a like molar amount te appropriate 4-alkylcyclohexylamine and acid anhydride for the 4-n-hexylcyclohexylamine and acetic anhydride of Example 103. 104. N-Acetyl-4-isobutylcyclohexylamine: m. 96°–118° C. cis/trans ratio = 63(41.0 min.)/37 (47.2 min.) by G.L.C. method like that in Example 103 at a column temperature of 180° C.

Anal. Calc'd. for $C_{12}H_{23}NO$; C, 73.0; H, 11.7; N, 7.1%.

Found: C, 73.1; H, 12,2; N, 7.0%

105. N-Butyryl-4-isobutylcyclohexylamine.

106. N-Acetyl-4-n-pentylcyclohexylamine: m. 45°–95°C. cis/trans ratio = 68(34.3min.)/32(39.9min.) by G.L.C. method like that in Example 103 at a column temperature of 200° C.

Calc'd. for $C_{13}H_{25}NO$; C, 75.0; H, 11.9; N, 6.6%.

Found: C, 73.6; H, 12.3; N, 6.6%.

N-Propionyl-4-n-pentylcyclohexylamine.

N-Acetyl-4-cyclopentylmethylcyclohexylamine: m. 65°–78° C. cis/trans ratio = 74(33min.)/26(37min.) by G.L.C. Method like that in Example 103 at a column temperature of 225° C.

Calc'd. for $C_{14}H_{25}NO$: C, 75.4; H, 11.2; N, 6.2%.

Found: C, 75.2; H, 11.4; N, 6.2%.

N-Propionyl-4-cyclopentylmethylcyclohexylamine.

N-Acetyl-4-(2-methylpentyl)cyclohexylamine: m. 58°–69° C. cis/trans ratio = 87(54.5min.)/13(62.6min.) by G.L.C. method similar to that in Example 103 at a column temperature of 190° C.

Calc'd. for $C_{14}H_{27}NO$; C, 74.7; H, 12.1; N, 6.2%.

Found: C, 74.6; H, 11.9; N, 6.0%.

N-Acetyl-4-Cyclobutylmethylcyclohexy/amine: m. 42°–59° C. cix/trans ratio = 7843.5min)/22(49.6min) by a G.L.C. Method like that in Example 103 at a column temperature of 200° C.

Found: C, 74,7; H, 11.1; N, 6.5%

112. N-Acetyl-4-n-heptylcyclohexylamine; m. 61°–114° C., cis/trans ratio = 64(23.5min.)36(27.0-min) by a G.L.C. method like tjat om Example 103 at a col. temperature of 230° C.

Calc'd. for $C_{15}H_{29}NO$: C, 75.3; H, 12.2; N, 5.9%

Found: C, 75.0; H, 12.1; N, 5.9%,

113. N-Acetyl-4-n-octylcyclohexylamine; m. 62°–82° C. cis/trans ratio = 75(31.5min.)25(36.5min.) by a G.L.C. method similar to that of Example 112.

Calc'd. for $C_{16}H_{31}NO$: C, 76.0; H, 12.3; N, 5.5%.

Found: C, 75.8; H, 12.3; N, 5.4%.

117. N-Acetyl-4-cyclooctylmethylcyclohexylamine.

118. N-Acetyl-4-cyclonoylmethylcyclohexylamine.

119. N-Acetyl-4-(2-[2.2.1]-bicyclohepthylmethyl)cyclohexylamine: m. 111°–113° C. cix/trans ratio 73(55.8min.)/27(63.5min.) by G.L.C. method like that in Examp/e 103 at a column temperature of 225° C.

Calc'd. for $C_{16}H_{27}NO$; C, 77.2; H, 10.9; N, 5.6%.

Found: C, 76.9; H, 10.7; N, 5.6%.

120. N-Acetyl-4-(1-adamantylmethyl)cyclohexylamine.

121. N-acetyl-4-(2-[2.2.2.]-bicyclooctylmethyl)cyclohexylamine.

122. N-acetyl-4-(2-[3.2.1]-bicyclooctylmethyl)cyclohexylamine.

123. N-Acetyl-4-(2-[3.3.1]-bicyclononylmethyl)cyclohexylamine.

124. N-Acetyl-4-(1-homoadamantylmethyl)cyclohexylamine.

125. N-Acetyl-4-(2-[3.2.0]-bicycloheptylmethyl)cyclohexylamine.

Example 126

A sample of 4-cyclobutylmethylcyclohexylamine (10 g.; 0.060 mole) is refluxed for 3 hours with 20 ml. of methylformate. The solution is then evaporated in vacuum and the residual N-formyl-4-cyclobutylmethylcyclohexylamine is purified by recrystallizaton from hexane. This N-formyl-4-cyclobutylmethylcyclohexylamine is used to treat mice and other animals according to the procedures given in United States Pat. application Ser. No. 532,544, filed Mar. 1,1966, now abandoned Example 127

A mixture of N-formyl -4-cyclohexylmethylcyclohexylamine (b 7.9g.; 0.035 mole) and lithium aluminum hydride (LAH) (3.8g.; 0.10mole) is heated in 100 ml. of refluxing ether for 24 hours. The suspension is cooled, and the lithium aluminum hydrige is decomposed using wet ether and then a saturated, aqueous solution of sodium sulfate. This decomposition should be performed cautiously to avoid a fire. The precipitated salts are filtered and washed with ether, The etheral solution is then dried with magnesium sulfate, filtered and evaporated in vacuum learving an oil. The infra-red spectrum shows the oil to be an amine. The N-methyl-Ncyclohexylmethylcyclohexylamine is purified by vacuum distillation.

Examples 128–141

The following dialkylamines are prepared according to the procedure described for N-Methy/-N-cyclohexylmethyl-cyclohexylamine in Example 127 by substituting in like amount by weight the appropriate N-formal or N-acetyl-4-alkylcyclohexylamine for the N-formyl-N-cyclohexylmethyl-cyclohexylamine in Example 127.

128. N-Methyl-N-(4-cyclobutylmethylcyclohexyl)amine.

129. N-Ethyl-N-(4-n-butylcyclohexyl)amine.

130. N-Methyl-N-(4-n-hexylcyclohexyl)amine.

131. N-Ethyl-N-(cyclononylmethylcyclohexyl)amine.

132. N-Methyl-n-[4-(3-cyclopentylpropyl)cyclohexyl]amine.

133. N-Ethyl-N-[4-(2-]2.2.1]-bicycloheptylmethyl)cyclohexyl]-amine.

134. N-Methyl-N-(4-n-heptycyclohexyl)amine.

135. N-Methyl-N-(4-cyclopentylmethylcyclohexyl)amine.

136. N-Methyl-N-(4-cycloheptylmethylcyclohexyl)amine.

137. N-Ethyl-N-[4-(2-methylpentyl)cyclohexyl]amine.

138. N-Methyl-N-8 b 4-(2-[3.3.1]-bicyclononylmethyl)cyclohexyl]amine.
139. N-Methyl-N-[4-(1-adamantylmethyl)cyclohexyl]amne.
140. N-Ethyl-n-[4-(1-adamantylmethyl)cyclohexyl]amine.
141. N-Methyl-N-(4-[1-homoadamantylmethyl]cyclohexyl)amine.

EXAMPLES 142 – 156

The following N-acyl-N-methyl or ethyl-N-4-alkylcyclohexylamine derivatives are prepared according to the directions given for preparing N-acetyl-4-n-hexylcyclohexyamine in Example 103 or N-formyl-4-cyclobutylmethylcyclohexylamine in Example 126 by substituting the obvious reactants in like molar amount by weight for those given in Examples 103 and 126.

142. N-Acetyl-N-methyl-N-(4-cyclobutylmethylcyclohexyl)amine.
143. N-Acetyl-N-ethyl-N-(4-n-butylcyclohexyl)amine.
144. N-Formyl-N-methyl-N-(4-n-hexylcyclohexyl)amine.
145. N-Formyl-N-ethyl-N-(4-cyclopentylmethylcyclohexyl)amine.
146. N-Propionyl-N-methyl-N-(4-cycloheptylmethylcyclohexyl)-amine.
147. N-Butanoyl-N-methyl-N-(4-cyclononylmethylcyclohexyl)amine.
148. N-Acetyl-N-ethyl-N-(4-n-pentylcyclohexyl)amine.
149. N-Acetyl-N-methyl-N-(4-n-heptylcyclohexyl)amine. 150. N-Acetyl-NQethyl-N-[4-(2-methylpentyl)cyclohexyl]amine.
151. N-Butanoyl-N-methyl-N-(4-isobutylcyclohexylamine.
152. N-Formyl-N-ethyl-N-(4-n-octylcyclohexyl)amine.
153. N-Formyl-N-methyl-n-[4-(2-[2.2.1]-bicycloheptylmethyl)-cyclohexyl]amine.
154. N-Acetyl-N-ethyl-N-[4-(1-adamantylmethyl)cyclohexyl]-amine.
155. N-Acetyl-N-methyl-N-[4-(1/-homoadamantylmethyl)cyclohexyl]-amine.
156. N-Acetyl-N-methyl-N-[4(2-[3.3.1]-bicyclononylmethyl)-cyclohexyl]amine.

I claim:

1. A compound of the formula:

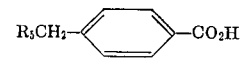

wherein p1 $R_5$ is selected from the group consisting of cycloalkyl of 4 through 9 carbon atoms, cycloalkylalkyl of 5 through 10 carbon atoms, bicycloalkyl of 7 through 10 carbon atoms, and tricycloalkyl of 10 through 11 carbon atoms.

2. A compound of the formula:

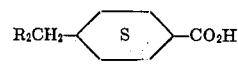

wherein
$R_2$ is alkyl of 3 through 8 carbon atoms, cycloalkyl of 4 through 9 carbon atoms, cycloalkylalkyl of 5 through 10 carbon atoms, bicycloalkyl of 7 through 10 carbon atoms and tricycloalkyl of 10 through 11 carbon atoms.

3. A compound according to claim 1 which is 4-cyclobutylmethylbenzoic acid.
4. A compound according to claim 1 which is 4-cyclopentylmethylbenzoic acid.
5. A compound according to claim 1 which is 4-cyclohexylmethylbenzoic acid.
6. A compound according to claim 1 which is 4-(2-[2.2.1]-bicycloheptylmethyl)benzoic acid.
7. A compound according to claim 1 which is 4-(1-adamantylmethyl)benzoic acid.
8. A compound according to claim 2 which is 4-cyclobutylmethylcyclohexane carboxylic acid.
9. A compound according to claim 2 which is 4-cyclopentylmethylcyclohexane carboxylic acid.
10. A compound according to claim 2 which is 4-cyclohexylmethylcyclohexane carboxylic acid.
11. A compound according to claim 2 which is (2-[2.2.1]-bicycloheptylmethyl)cyclohexane carboxylic acid.
12. A compound according to claim 2 which is 4-(1-adamantylmethyl)cyclohexane carboxylic acid.
13. A compound according to claim 2 which is 4-hexylcyclohexane carboxylic acid.

* * * * *